United States Patent [19]
Parsons

[11] Patent Number: 4,692,939
[45] Date of Patent: Sep. 8, 1987

[54] SWITCH TESTING

[75] Inventor: Donald F. Parsons, West Chester, Pa.

[73] Assignee: Communications Test Design, Inc., West Chester, Pa.

[21] Appl. No.: 841,173

[22] Filed: Mar. 19, 1986

[51] Int. Cl.⁴ ............................................. H04M 3/28
[52] U.S. Cl. ...................................... 379/16; 379/17; 324/421; 324/423
[58] Field of Search ...................... 179/175.21, 175.25, 179/175.2 R, 175.2 C; 371/20, 15; 324/421, 423, 73 AT

[56]     References Cited
U.S. PATENT DOCUMENTS
4,167,656  9/1979  Duyance et al. ............ 179/175.2 R Primary Examiner—Stafford D. Schreyer
Attorney, Agent, or Firm—Connolly and Hutz

[57]            ABSTRACT

Switches of telephone grids are tested for delayed action subsequent to, but within a number of milliseconds after, actuating the opening or closing of the switches. Excessive delay indicates approaching failure.

9 Claims, 3 Drawing Figures

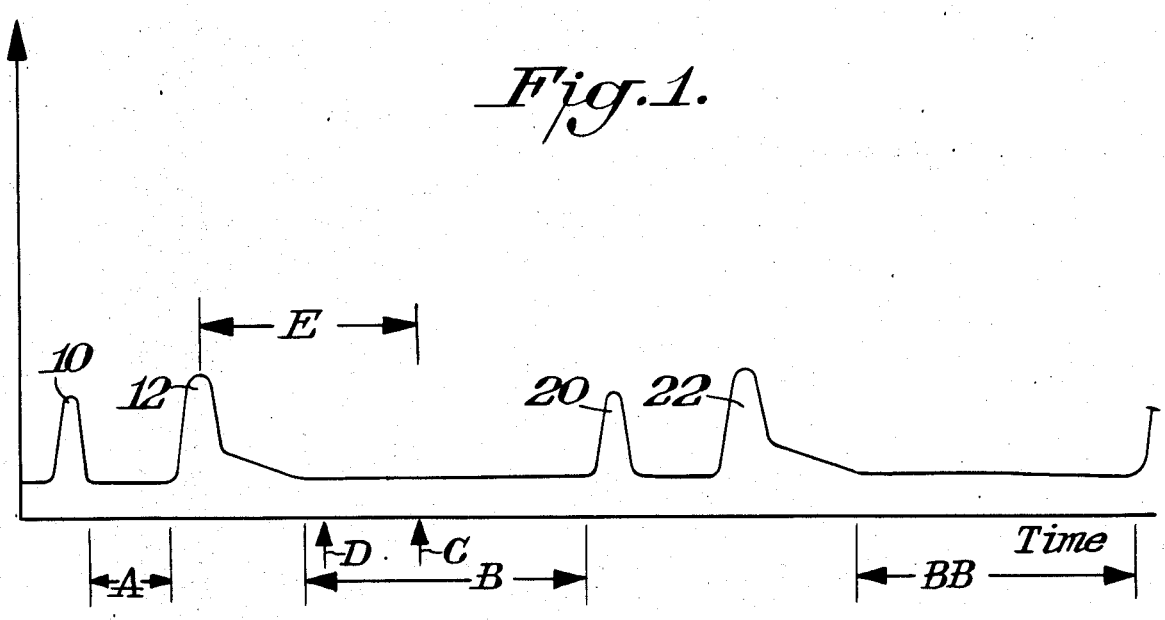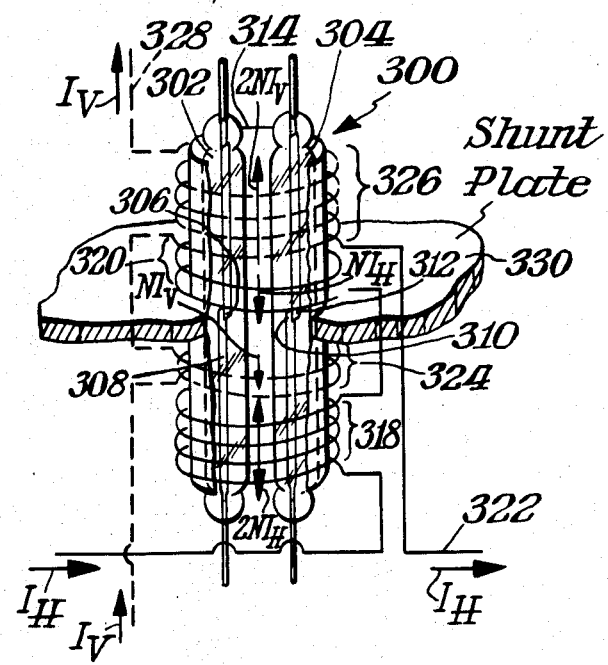

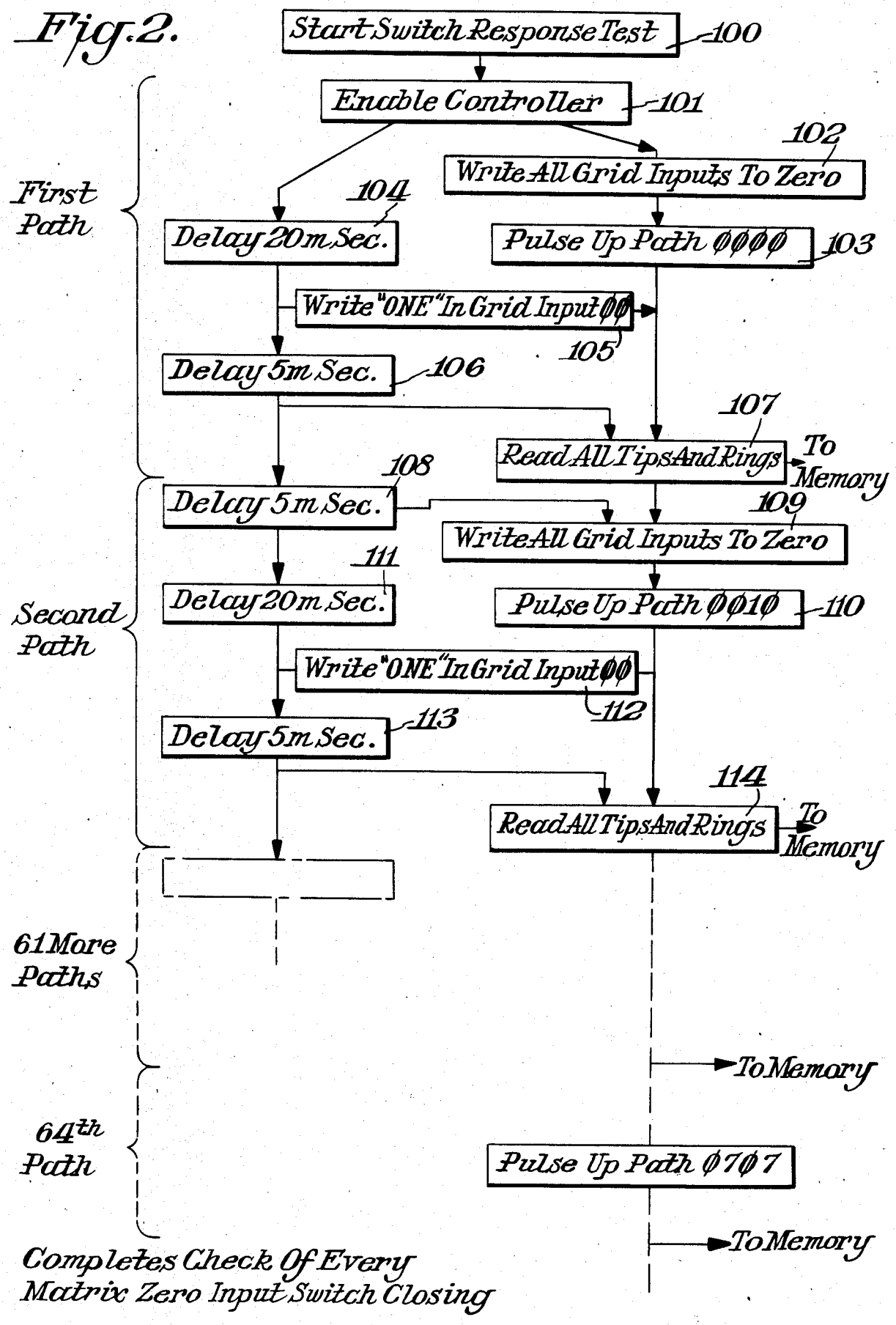

SWITCH TESTING

The present invention relates to the testing of telephone grid switches and the like.

Among the objects of the present invention is the provision of improved switch testing methods and apparatus.

The foregoing as well as additional objects of the present invention will be more fully understood from the following description of several of its exemplifications, reference being made to the accompanying drawings wherein:

FIG. 1 illustrates a pulsing technique for carrying out the testing method of the present invention;

FIG. 2 is a flow diagram typical of the testing method of the present invention; and FIG. 3 is an illustration of a switch of the type suitable for the testing of the present invention.

Prior application Ser. No. 520,194 filed Aug. 4, 1983, now U.S. Pat. No. 4,540,857, granted Sept. 10, 1985 describes a very desirable technique for inexpensively, rapidly and accurately testing the switches and switch contacts of various types of telephone switching grids. A chain of such switching grids is normally used to enable a telephone subscriber, for example, to be connected through selected telephone trunk lines, distribution lines and central offices, to another subscriber. Each grid can have several hundred switches, and the failure of one switch in one of the grids could seriously affect all subscribers connected to that grid. Although the grid switches are very carefully manufactured, installed and tested, they are subject to failures of different kinds, including wiring failure that keeps the switch from receiving switch-actuating pulses or from receiving sufficient switch-actuating energy from a pulse, failure to close in response to proper switch-closing pulses, failure to open in response to switch-opening pulses, failure to establish a sufficiently low switch-contact resistance when closing, failure to establish a sufficiently high resistance when opening, and damage as by being subjected to high voltages that may be unintentionally applied as, for example, by ringing signals that cross over from their intended conductors.

Failure of one or more switches in a grid frequently takes place gradually, as well as intermittently, so that the prior art detailed testing of a grid may not reveal all problems.

According to the present invention, more reliable grid testing is effected by determining whether any of the grid's switches or switch contacts is slow to open or close. It has been discovered that such slowly responding switches frequently become failure switches by the time they are subjected to several hundred additional operating cycles.

The sealed magnetically operated reed switches currently in wide use in telephone grids, normally respond in less than about eight milliseconds to their actuating magnetic pulses. The effective closing of such a switch that is delayed more than about 12 milliseconds after a switch-closing pulse of its magnetic-field-generating electric current is accordingly a very good indication that the switch is headed for early failure. Similarly, a switch that takes more than about 12 to 40 milliseconds to open after a pulse of its magnetic-field-generating-opening current also indicates early failure. The switch reeds themselves have a substantial magnetic remanence and are mechanically biased toward their switch-open position. Their remanence and biasing force are such that a switch-closing pulse of magnetism leaves the reed contacts oppositely polarized magnetically to such a degree that they magnetically attract each other sufficiently strongly to overcome their mechanical bias and come together with sufficient force to remain together and show a contact resistance substantially less than 30 ohms. The termination of the magnetic pulse leaves the contact in this switch-closing condition.

When such a closed switch is to be switched to its open-circuit condition, the reeds are demagnetized or magnetized such that their contacts magnetically repel each other, thus causing them to separate to their mechanically biased open-circuit condition.

The switch testing of the present invention is preferably accomplished by a modification of the testing technique described in Ser. No. 520,194, and the entire contents of that prior application are hereby incorporated herein as though fully set forth.

The standard switch-pulse generating circuits of telephone central offices can be used to generate a succession of electric pulse pairs in rapid sequence. The first pulse of each pair is a switch-opening pulse, and the second pulse of each pair is a switch-closing pulse. Very good results have been obtained with the switch-closing pulses greater in amplitude, but amplitudes equal to or smaller than the switch-opening pulses can also be used. The first and second pulses of each pair are preferably spaced about 3 to about 10 milliseconds apart, and the spacing between the second pulse of one pair and the first pulse of the next pair is preferably about 20 to about 60 milliseconds. The checking of the switches can be completed in less than about 10 microseconds, once they have been pulsed.

The testing of the present invention can also be accomplished with separate trains of pulses, using separate circuits. Thus, one circuit can accomplish and then check the switch openings, and another circuit accomplish and then check the switch closings. Preferably, a sync interconnection can be made between such circuits to make sure one does not outpace the other.

A single pulse can also be used to first open switches and then to close a selected set of them, but having the pulse extended in time and arranging for a first portion of the pulse to go through the switch-opening circuits whereas a later portion of the pulse goes through the selected switch-closing circuits.

The usual telephone pulsing is with pulsing-on pulses having the same polarity as pulsing-off pulses, generally about 4 amperes 2 milliseconds long for the pulsing-off and about 3.75 amperes 3 or 4 milliseconds long for pulsing-on. However, other pulse magnitudes and polarities can be used, so long as they are effective with the switches being pulsed. Where the switching is by solid state gates such as diodes and transistors, substantially lower pulse amplitudes can be used.

Where the switches will not be damaged by repeated switching-on pulses without intervening switching-off pulses, the switching-off pulses can be omitted when not needed. However it is particularly helpful to assure that every switch-on actuation is applied to a switch that is off, to thus more fully check the switch-on operation.

Such a procedure also helps to reduce damage to currently used switches which have contacts that suffer abrasion when subjected to successive closing actuations without intervening openings.

FIG. 1 shows typical pulses as currently used to open and close the contacts of telephone grid switches. In this figure, the abscissa is a time scale, and the ordinate is current amplitude. Upon the initiation of a pulse sequence, as by the triggering of an enable pulse to the controller as illustrated in FIG. 4 of Ser. No. 520,194, there is a short delay after which there is generated a pre-positioning pulse 10 which is passed through the control windings of switches to open their contacts. After the completion of pulse 10 there is a pause "A" of about 5 to about 8 milliseconds followed by pulse 12. Pulse 12 is a switch-closing pulse appropriately directed through the windings of switches which are to have their contacts closed. These are generally the same switches that had their contacts opened by pulse 10. Only about a 2-millisecond pulse 10 is sufficient to magnetically open switch contacts after which those contacts remain open until pulse 12 magnetically closes the contacts that provide the desired input-output path. They then remain closed until a further switch-opening pulse reaches them.

After pulse 12, there is a pause of about 15 to about 25 milliseconds as shown at "B", following which there is a second switch-opening pulse shown at 20, and a second switch-closing pulse 22, as a repetition of pulses 10 and 12. The entire pulse sequence cycle is then repeated again as many times as needed.

According to the present invention, a reading is made at about point "C", of the resistance across the contacts of the freshly closed switch or switches. One very practical way to make that reading is to use the comparator circuits of Ser. No. 520,194 as illustrated in its FIG. 3, for example, after writing a logic high in the grid input circuit for the closed input-output talk circuit. Such writing can be applied at point "D", for example.

The time space between the contact closing point of the switch and the read point "C" is shown at "E" and should be at least about 12 milliseconds for the standard grid switches currently used. It can, however, be as long as 25 or even 50 milliseconds. For times as long as 50 milliseconds, the read step will take place during the next pulsing sequence 20, 22, etc., preferably during the pause "BB". In that event, the pulses 20 and 22 are applied to switches different from the switches that are actuated by pulses 10 and 12.

A very effective program for rapidly and reliably checking the switch response times for all the contacts of a typical 64-by-64 telephone grid, is shown in FIG. 2. This test also can be used on grids which have matrices other than 64×64. Other such grids can have 16×64 or 32×64 or 16×32 matrixes.

A 64-by-64 telephone grid is described in Ser. No. 520,194 and contains eight input switch matrixes each of 64 sets of switch contacts, and also eight output switch matrixes each of 64 sets of switch contacts. Each matrix has eight rows or levels of switch contacts, each level containing eight interconnected sets of such contacts. The respective matrixes are generally referred to as input switch "zero", input switch "one", input switch "two", etc., to input switch "seven", with similar numbering for the output matrixes. A path from input to output can be designated 0000 for example, to indicate (reading from left to right) that it runs from input switch (matrix) zero, level zero, to output switch (matrix) zero, level zero.

Turning now to the flow sheet sequence of FIG. 2, that sequence is shown as a separate testing sequence, but it can be combined with other testing operations. It can start with the operation of a start switch as at 100, which then closes an enable circuit, as at 101, in a microprocessor controller such as shown in FIG. 4 of Ser. No. 520,194. The controller then at 102 writes a zero in all grid inputs. This effectively grounds those inputs and reduces the possibility of current flow through the switches during the next step 103 where the input-output path 0000 is pulsed up by pulses 10 and 12.

After a 20 millisecond delay at 104, timed from the enabling of 101, the point D of FIG. 1 is reached, and as shown at 105 a "ONE" is written into both the tip and the ring of the talk circuit input of switch (matrix) zero, at the level zero row of eight sets of contacts. This should unground the input and output tips and rings of the 0000 path. A further 5-millisecond delay at 106 takes the sequence to point C in FIG. 1, and there at 107 the tips and rings of all grid talk input and output circuits are read. These readings can be transferred to memory where they can be analyzed either immediately or at some subsequent time, or both.

The foregoing completes the testing of a first input-output path through level zero of input switch zero and level zero of output switch zero. Now, starting with a delay 108 of five more milliseconds the second path testing sequence is conducted in steps 109, 110, 111, 112, 113 and 114. These duplicate the steps 102, 103, 104, 105, 106 and 107, respectively, but with input-output path 0010. This completes the testing of the second path, through different switch contacts in level zero of input switch zero, and also through switch contacts in level zero of output switch 1.

The sequence can then go through further steps as in the following input-output path sequence:

0020
0030
0040
0050
0060
0070
0171
0161
0151
0141
0131
0121
0111
0101
0202
0212
0222
0232
0242
0252
0262
0272
0373
0363
0353
0343
0333
0323
0313
0303
0404 through 0474
0575 through 0505
0606 through 0676
0777 through 0707
1707 through 1777
1676 through 1606
1505 through 1575

1474 through 1404
1303 through 1373
1272 through 1202
1101 through 1171
1070 through 1000
2000 through 2707, as in 0000-0707
3707 through 3000, as in 1707-1000
4000 through 4707, as in 0000-0707
5707 through 5000, as in 1707-1000
6000 through 6707, as in 0000-0707
7707 through 7000, as in 1707-1000

The signals delivered from stages 107, 114 and corresponding later stages, are compared with the expected set of signals to determine whether there are any differences. The 107 signals are expected to show a zero for every tip and ring except at input switch zero level zero, and output switch zero level zero. At these two locations a "ONE" is expected. Any lower magnitude signal at either tip or ring output, while the tip and ring inputs are "one", shows slow-closing at either or both sets of input and output contacts in the pulsed-up path. On the other hand, a low magnitude signal at either tip or ring input and the corresponding tip or ring output of the pulsed-up path shows a faulty opening of contacts in the input-switch level 00 for whatever different prior path was closed through that switch level at the time of the pulsing up to the new 0000 path. Because of the grounding in step 102, such prior path established through any contacts in input 00 level will act as a zero level short to drain off the "one" written into the newly pulsed-up input path 00 when previously closed input 00 contacts are too slow to open in time.

Inasmuch as the switch-opening circuits for the contacts in any individual output path level are also all linked together, a similar draining off of the "one" written into the newly pulsed-up path will take place if output contacts in a previously established 00 output path are too slow in opening.

A low signal level detected at the input of the newly pulsed-up path 0000, accordingly shows slow-opening contacts in a prior 00 input or 00 output path.

In the step from path 0070 to 0171, the connection link between the input and output switches is not changed. It is still the link between input matrix switch zero and output matrix switch 7 as shown in FIG. 1 of Ser. No. 520,194 (now U.S. Pat. No. 4,540,857). This link connects to a pair of contacts at each level of input matrix switch zero, these contacts being interconnected and in the number seven column of that matrix. Accordingly, when stepping from path 0070 to path 0171 after grounding all the inputs, slow opening of the 00 input switch level contacts in column 7 will show up as a drop in the pulsingup signal applied to the 01 input switch contacts in column 7.

The same type of signal drop will show up when stepping from path 0101 to path 0202 in the foregoing sequence, if the input 01 level contacts in the zero column are slow opening.

In the sequence step from path 0707 to 1707, slow opening of the contacts in the output matrix switch level 07 will be detected. A similar detection will take place when stepping from path 1000 to path 2000, from path 2707 to 3707, from 3000 to 4000, from 4707 to 5707, from 5000 to 6000, and from 6707 to 7707.

Each step in the sequence will accordingly test previously closed contacts for slowness of opening. This is in addition to a test for the slowness of closing contacts at each step.

Additional sequencing steps can be added, as for example to test for the opening slowness of the contacts closed in the last step of the sequence. This is easily accomplished by merely repeating the pulsing-up of the last path in the sequence, immediately after that path has been tested the first time.

Other types of extra path pulsings can be used to repeat or extend the switch testings. Thus the foregoing detailed sequence detects slow opening of output contacts in the following steps:
0707 to 1707
1000 to 2000
2707 to 3707
3000 to 4000
4707 to 5707
5000 to 6000
6707 to 7707
7000 to 7000

To test the slow opening of additional output contacts, every input-output circuit can be established twice, before shifting to the next input-output circuit of the foregoing sequence. Alternatively, the following sequence can be used:
7000
6000
5000
4000
3000
2000
1000
0000
518 101
1101
2101
3101
4101
5101
6101
7101
7202
6202
5202
4202
3202
2202
1202
0202
0303
1303
2303
3303
4303
5303
6303
7303
7404
6404
5404
4404
3404
2404
1404
0404
0505
1505
2505
3505
4505

5505
6505
7505
7606
6606
5606
4606
3606
2606
1606
0606
0707
1707
2707
3707
4707
5707
6707
7707
7717
6717
5717
4717
3717
2717
1717
0717
0616
1616
2616
3616
4616
5616
6616
7616
then correspondingly
7515 through 0515
0414 through 7414
7313 through 0313
0212 through 7212
7111 through 0111
0010 through 7010
7020 through 0020
0121 through 7121
7222 through 0222
0323 through 7323
7424 through 0424
0525 through 7525
7626 through 0626
0727 through 7727
7737 through 0737
0636 through 7636
7535 through 0535
0434 through 7434
7333 through 0333
0232 through 7232
7131 through 0131
0030 through 7030
7040 through 0040
0141 through 7141
7242 through 0242
0343 through 7343
7444 through 0444
0545 through 7545
7646 through 0646
0747 through 7747
7757 through 0757
0656 through 7656

7555 through 0555
0454 through 7454
7353 through 0353
0252 through 7252
7151 through 0151
0050 through 7050
7060 through 0060
0161 through 7161
7262 through 0262
0363 through 7363
7464 through 0464
0565 through 7565
7666 through 0666
0767 through 7767
7777 through 0777
0676 through 7676
7575 through 0575
0474 through 7474
7373 through 0373
0272 through 7272
7171 through 0171
0070 through 7070

Here again, before shifting from one level of output contacts in one output switch to a different level of output contacts in the same output switch or to output contacts of a different output switch, the input-output circuit can be pulsed up a second time. This repetition tests for slow opening of those output contacts, as before shifting from path 0000 to path 0101, or from 7101 to 7202, or from 0202 to 0303, etc.

Instead of having switch-opening pulses precede the respective switch-closing pulses, the switch opening pulses can follow the respective switch-closing pulses. In such inverted sequence the switch-opening pulses can be confined to the unswitched contacts in the same input and output switch levels of the talk path established by the switch-closing pulses.

Because of the speed with which each step of the testing can be conducted, the entire testing for slow closing and slow opening of all contacts in a 64-by-64 matrix can be completed in about a minute or less. The results of the testing are stored in memory and can be scanned after the entire testing is completed to determine whether the matrix needs repair. Alternatively, as in Ser. No. 520,194 the test signals can be compared with a pre-loaded set of memory signals as the test signals are recorded, and the test sequence automatically interrupted whenever test signals do not match the pre-recorded signals.

If desired, the slow closing of matrix contacts can be tested without testing for any slow opening, or vice versa. Whether or not both types of tests are conducted, each set of switch contacts will have been tested and the condition of the matrix can be appraised. The testing can also be repeated one or more times, with or without changes in the time delays between the actuation of a switch and the reading of the test signals. Changes in the time delays are conveniently provided by use of auxiiary pulse generators that are switched into the scanning circuit when needed. Alternatively, any of the test sequences of the present invention can be combined with a test sequence of Ser. No. 520,194.

Some grids contain additional switches, called F-switches, that enable talk connections to be made to the subscriber's input lines. These additional switches can also be subjected to the testing of the present invention, and simply tested one at a time before, during or after the main testing sequence. The connectors used to connect a grid to the testing apparatus, can merely be modified to also supply the desired pulsing, grounding and "one" writing connections to the F-switches.

The currently used grid switches are illustrated at 300 in FIG. 3. Two glass-enclosed and sealed-in sets 302, 304 of reed contacts 306, 308 and 310, 312 are held within a coil form 314. One contact set 302 is for the tip circuit, the other 304 for the ring circuit.

Around the form are wound two different sets of windings, one designated $I_H$ and shown by solid lines. The other is designated $I_V$ and is shown by dashed lines. Tracing the $I_H$ winding in the direction of the associated arrows, it will be noted that this winding turns counterclockwise four turns, looking down on the switch from above into the open end of form 314. Those four turns are shown at 318 and are around the lower half of the switch. From there, winding $I_H$ runs to the upper half of the switch where it goes through two clockwise turns 320 and then to connector 322 from which it goe through the same windings in the next switch in the same row of switches.

The $I_V$ winding goes through two clockwise turns 324 around the lower section of the switch, then through four counterclockwise turns around the upper section, and from there through line 328 to the next switch in the same column of switches. A row of switches can be a single input switch level, and a column of switches a single output switch level.

A pulse current through the $I_H$ windings generates a field $2NI_H$, twice as strong around the reeds 308, 310, as field $NI_H$ around reeds 306, 312, and these fields are oppositely directed. This magnetically polarizes the reeds so that reed 306 is repelled from reed 308, and reed 310 is repelled from reed 312.

However, a current pulse that passes through both the $I_H$ and $I_V$ windings causes the reeds to attract their partners, so that they close their respective contacts. This follows because the $NI_V$ field of the $I_V$ windings partially neutralizes the $2NI_H$ field at the lower switch section, whereas the $2NI_V$ field of the $I_V$ winding reverses the field at the upper switch section. The resulting upper and lower fields accordingly have the same magnetic polarity and correspondingly polarize their reeds.

A magnetic shunt plate 330 around the switch equator helps the switching action.

Ordinary relays can be substituted for the switches of FIG. 3, with each relay having two windings separately ganged to other relays such that a pulse in one winding opens its circuit while a pulse in the other winding creates a force large enough to override the opening and cause the circuit to close. Such pulses can be separately applied from a closing circuit separate from an opening circuit.

Obviously many modifications and variations of the present invention are possible in the light of the above teachings. It is, therefore, to be understood that within the scope of the appended claims the invention may be practiced otherwise than as specifically described.

What is claimed:

1. In the testing of a telephone switching grid having a matrix of individual switches by applying path-establishing pulses that successively close the individual switches to establish talk paths and determining whether the electrical resistance of the talk paths is within tolerance, the improvement according to which the switches are subsequently checked for response time by determining whether the electrical resistance is within tolerance before about 50 milliseconds have elapsed after the path-establishing pulse.

2. The combination of claim 1 in which some of the path-establishing pulses are switch-opening pulses and some are switch-closing pulses, and each switch-closing pulse is preceded by a switch-opening pulse to the same switches that receive the switch-closing pulse.

3. The combination of claim 1 in which the electrical resistance determination as to each path is effected within about 25 milliseconds after applying the path establishing pulse.

4. The combination of claim 1 in which the switch-closing pulses are applied to individual switches at approximately the same time switch-opening pulses are applied to previously switched-on switches to cause the previously switched-on switches to be switched off.

5. The combination of claim 4 in which the electrical resistances of the individual pulsed-off switches are determined before about 40 milliseconds have elapsed after they are pulsed off.

6. The combination of claim 5 in which the switching-on pulses are in the same pulse train and alternate with the switching-off pulses.

7. The combination of claim 4 in which the electrical resistance determination is essentially simultaneously made on the switched-off switches and on the switched-on switches.

8. The combination of claim 1 in which each establishment of a talk path is preceded by the step of opening the electrical circuit of a previous talk path.

9. The combination of claim 8 in which the path-establishing steps are effected in a sequence that enables testing of the switch-closing action of a new path as well as the switch-opening action of a previously established path.

* * * * *